US010106324B2

United States Patent
Menke et al.

(10) Patent No.: US 10,106,324 B2
(45) Date of Patent: Oct. 23, 2018

(54) CONVEYOR SYSTEM FOR CONVEYING MATERIAL TO BE CONVEYED

(71) Applicants: Lucas Menke, Munich (DE); Klaus Englisch, Koenigsbrunn (DE)

(72) Inventors: Lucas Menke, Munich (DE); Klaus Englisch, Koenigsbrunn (DE)

(73) Assignee: MERI ENVIRONMENTAL SOLUTIONS GMBH, Munich (DE)

( * ) Notice: Subject to any disclaimer, the term of this patent is extended or adjusted under 35 U.S.C. 154(b) by 10 days.

(21) Appl. No.: 15/322,713

(22) PCT Filed: May 29, 2015

(86) PCT No.: PCT/EP2015/061976
§ 371 (c)(1),
(2) Date: Dec. 28, 2016

(87) PCT Pub. No.: WO2016/000876
PCT Pub. Date: Jan. 7, 2016

(65) Prior Publication Data
US 2017/0137224 A1    May 18, 2017

(30) Foreign Application Priority Data

Jul. 2, 2014  (DE) .......................... 10 2014 109 284

(51) Int. Cl.
*B65G 15/08*    (2006.01)
*B65G 15/36*    (2006.01)
(Continued)

(52) U.S. Cl.
CPC ............. *B65G 15/08* (2013.01); *B65G 15/36* (2013.01); *B65G 15/40* (2013.01); *B65G 15/42* (2013.01);
(Continued)

(58) Field of Classification Search
CPC ........ B65G 15/08; B65G 15/36; B65G 15/42; B65G 43/00
(Continued)

(56) References Cited

U.S. PATENT DOCUMENTS 6,971,506 B2 * 12/2005 Hassinen ............... G01N 35/04
198/803.14
7,066,314 B2 * 6/2006 Whiteman ........... H01C 17/281
118/500
(Continued)

FOREIGN PATENT DOCUMENTS

DE        19902508 A1    8/2000
DE        10025350 A1    2/2001
(Continued)

*Primary Examiner* — Douglas A Hess
(74) *Attorney, Agent, or Firm* — Hershkovitz & Associates, PLLC; Abe Hershkovitz; Eugene C. Rzucidlo

(57) ABSTRACT

The invention relates to a conveyor system for conveying at least one material to be conveyed, comprising a continuously circulating conveyor, at least one transponder, preferably an RFID transponder, arranged on or in the conveyor, and at least one communication device for wirelessly transmitting data to the transponder and/or for wirelessly reading data saved in the transponder, said conveyor being a pocket conveyor belt. The conveyor preferably comprises a plurality of transponders arranged at regular intervals, wherein the data transmitted to the individual transponders or the data saved in the individual transponders preferably relates to information about a defined section of the conveyor, such as information relating to the type and/or amount of the material to be conveyed in a section of the conveyor assigned to the respective transponder.

14 Claims, 4 Drawing Sheets

Figure 1:
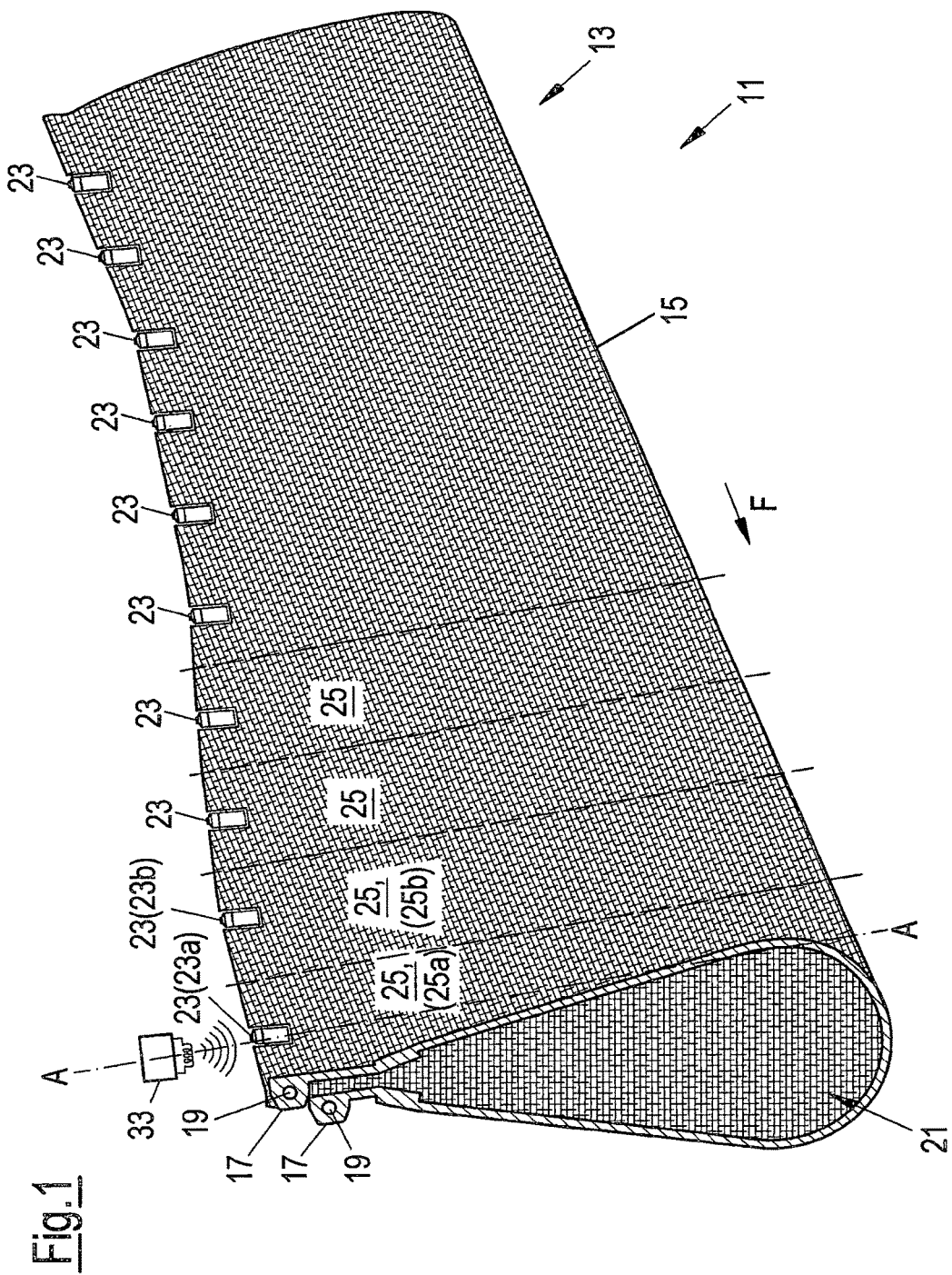

(51) Int. Cl.
*B65G 15/42* (2006.01)
*B65G 43/00* (2006.01)
*B65G 15/40* (2006.01)

(52) U.S. Cl.
CPC ........ *B65G 43/00* (2013.01); *B65G 2203/046* (2013.01)

(58) Field of Classification Search
USPC ..... 198/715, 803.14, 803.15, 867.11, 867.12
See application file for complete search history.

(56) References Cited

U.S. PATENT DOCUMENTS

| | | | | |
|---|---|---|---|---|
| 7,318,519 | B2* | 1/2008 | Sorensen | B65D 1/34 |
| | | | | 198/349 |
| 8,607,963 | B2* | 12/2013 | Wend | B65G 47/61 |
| | | | | 141/250 |
| 8,731,711 | B1* | 5/2014 | Joplin | B21B 41/00 |
| | | | | 700/213 |
| 9,187,201 | B2* | 11/2015 | Ziegler | B29C 49/42 |
| 9,828,182 | B2* | 11/2017 | Schoenenberger | B65G 17/20 |
| 2013/0253697 | A1 | 9/2013 | Issing | |
| 2017/0088302 | A1* | 3/2017 | Auf Der Maur | |

FOREIGN PATENT DOCUMENTS

| | | |
|---|---|---|
| DE | 202004000956 U1 | 5/2004 |
| DE | 212006000033 U1 | 1/2008 |
| DE | 102010044614 A1 | 3/2012 |
| EP | 0716991 A1 | 6/1996 |
| EP | 1091895 A1 | 4/2001 |
| EP | 2631202 A1 | 8/2013 |
| EP | 2682355 A1 | 1/2014 |
| GB | 970253 A | 9/1964 |
| JP | 55-66410 A | 5/1980 |

* cited by examiner

CONVEYOR SYSTEM FOR CONVEYING MATERIAL TO BE CONVEYED

The present invention relates to a conveyor system for conveying at least one conveyed product as well as to a method for conveying at least one conveyed product.

Such conveyor systems are generally known and are generally used for conveying packaged material or bulk material. In such a conveyor system, the conveyor is normally configured in the form of a belt conveyor, with a distinction being made in accordance with the prior art between open and closed belt conveyors or belt systems.

With an open belt conveyor, mainly flat belts or troughed belts are used, while closed belt conveyors are designed, for example, as tubular goods conveyors, profile conveyors or sidewall conveyors.

Different comparable constructions are also known in addition to belt conveyors such as plate conveyor belts, link conveyor belts, element conveyors and the like.

Most conveyor technologies are restricted for technical reasons to the extent that as a rule only straight conveyor lines can be implemented. Conveyor belts that can negotiate corners are admittedly known; however, they normally comprise displaceable link elements so that they can only be used for comparatively short conveyor lines.

For the aforesaid reasons, the conveyor systems known from the prior art are normally used as so-called line conveyor systems that have a defined start with a loading region formed there and a defined end with an unloading region provided there. In this respect, a conveyor path or a conveyor belt revolves continuously between the start and the end of the conveyor line, with the conveyor belt being guided in an at least substantially straight manner between the start and the end of the conveyor line. More complex conveyor systems and in particular those that comprise one or more sharp corners are generally combined by conveyor lines that are arranged in series and between which respective transfer points are arranged to transfer the conveyed product from one conveyor line to the next conveyor line. Transfer points are thus required between consecutive conveyor lines in these conveyor systems, which makes the conveyor system expensive and complex to control.

It is thus disadvantageous in conveyor systems known from the prior art that they cannot be used or can only be used by expensive systems that are complex to operate for complex transport work such as in production processes.

It is therefore the underlying object of the present invention to provide a conveyor system that is of a simple construction design, that can be controlled simply and exactly and that can also be used for conveying conveyor belt over complex conveyor lines and in particular over conveyor lines having one or more sharp corners. The conveyor system should in particular allow different conveyed products to be transported sequentially alternately, in particular also with very short cycle times over different total lines or part lines of the conveyor system, with the loading points and unloading points for different conveyor products being able to be freely selected and being able to be changed at any time.

In accordance with the invention, this object is satisfied by a conveyor system having the features of claim 1 and in particular by a conveyor system for conveying at least one conveyed product that comprises:
- a continuously revolving conveyor, with the conveyor being a pocket conveyor belt;
- at least one transponder, preferably an RFID transponder, arranged at or in the conveyor; and
- at least one communication device for a wireless transfer of data to the transponder and/or for a wireless reading of data stored in the transponder.

In this respect, a section of the conveyor is preferably associated with the at least one transponder, i.e. the data transmitted to the transponder in the operation of the conveyor system or the data stored in the transponder are data that relate to information on a defined section of the conveyor such as data that relate to the type and/or quantity of the conveyed products at the interval of the conveyor associated with the respective transponder.

In the conveyor system in accordance with the invention, each conveyor section can thus be individually loaded with selected conveyed products and the conveyed products can easily be transported along the conveying direction, in particular from a selected loading region to a selected unloading region, because corresponding data relating to the conveyor section such as in particular data relating to the load of the section can be stored in transponder associated with the section of the conveyor and can be read out of the transponder. The functionality of the conveyor system is thereby increased. In addition, the conveyor system can be operated intelligently by use of the at least one transponder or of the data stored thereon. For example, the loading region intended for the conveyed products and the unloading region intended for the conveyed products can be specified in the stored data such that the conveyor system can initiate both the loading and the unloading of the section in the intended unloading region with reference to the data. A direct connection between the loading region and the unloading region is thus not necessary since the loading and unloading of the section can be controlled by the data stored on the transponder. Because a pocket conveyor belt is used as the conveyor, the conveyor or characterized by an exceptional corner negotiating capability. The conveyor for this reason in particular always has the same radius even in corners having an angle of up to 180°.

A plurality of transponders are preferably attached to or in the conveyor distributed over the total length of the conveyor, and indeed preferably at regular intervals from one another, with each transponder comprising data on a respective section of the conveyor and data with respect to the load of the respective associated section with conveyed products preferably being able to be stored on each transponder via the communication device. It is thereby possible to transport different conveyed products on different sections of the conveyor that are associated with different transponders and to unload said different conveyed products in a respective intended unloading region with reference to the data stored on the transponders. A complex conveyor system transporting a plurality of conveyed products can thus be implemented by means of the conveyor system in accordance with the invention that can also be "intelligently" operated or controlled using the transponders.

The section or sections of the conveyor in this respect normally each have a longitudinal extent in the conveying direction so that they can be loaded with a conveyed product.

The conveyor system can have at least one loading region and preferably a plurality of loading regions for loading a respective section of the conveyor with conveyed products. In this respect, the respective loading region can be designed such that the section can be loaded while it runs through the loading region. The conveyor thus does not have to be stopped for loading a section.

It is furthermore preferred that the conveyor system has at least one unloading region and preferably a plurality of unloading regions for unloading the section of the conveyor. The section of the conveyor can be unloaded in any of the unloading regions while the section of the conveyor runs through the unloading region. The conveyor thus does not have to be stopped for unloading a section.

Each unloading region is particularly preferably configured such that either an unloading or no unloading of the section selectively takes place in the unloading region. The section can thus also run through the unloading region without being unloading in so doing such that transported conveyed products can also be supplied to a downstream further unloading region. Complex conveyor lines having a plurality of unloading regions arranged after one another in the conveyor line can in particular also thereby be implemented.

In accordance with a preferred embodiment of the invention, the at least one transponder arranged at or in the conveyor is an RFID transponder and the at least one communication device is an RFID read/write device for wireless communication with the at least one transponder. The wireless communication device can in this respect in particular be configured for the wireless transmission of data to the transponder such that the data can be written to a memory of the transponder by means of the communication device. The communication device can furthermore be used for the wireless reading of data from the memory of the transponder.

Each unloading region of the conveyor system preferably has at least one communication device, with the communication device preferably being configured to detect a transponder moving into the loading region and/or to read the data stored on the transponder and/or to check with reference to the stored data whether the section associated with the transponder is loaded or not loaded and/or, if the section is not loaded, to initiate the loading of the section in the loading region and/or to store data with respect to the load of the section on the transponder. The communication device can thus control the loading of the section associated with the transponder in cooperation with the transponder and can store data related to the load on the transponder, said data then being transported onward in parallel with the load and thus being provided to a downstream device such as a communication device of an unloading region.

Each unloading region preferably equally comprises at least one communication device, with the communication device preferably being configured to detect a transponder moving into the unloading region and/or to read out the data stored on the transponder and/or to check with reference to the stored data whether the section associated with the transponder is loaded and/or to check with reference to the stored data whether the unloading region is the unloading region intended for the section and/or, if the unloading region is the intended unloaded region, to initiate the unloading of the section in the unloading region and/or, if the unloading region is not the intended unloading region, to prohibit the unloading of the section in the unloading region and/or to delete data with respect to the load of the section on the transponder after unloading said section. The unloading of a section can thus take place by the cooperation of the communication device and the stored data. A direction connection between the loading region and the unloading region for an initiation or control of the unloading procedure is thus not necessary.

The section associated with the transponder can only be released with reference to the data stored on the transponder for loading with a specific conveyed product or with a conveyed product from a group of specific conveyed products. A contamination of the section by a non-released conveyed product can thereby be prevented.

At least one communication device of at least one loading region can preferably be configured to check whether the section has been released for the conveyed product to be loaded before the loading of the section with a conveyed product. If the section does not have the required release, the communication device can prevent the section from actually being loaded with the conveyed product.

The section can be only be released for a specific loading region and/or can only be released for a specific unloading region with reference to the data stored on the transponder. In this respect, a communication device arranged in a loading region can be configured to check the data read from a transponder as to whether the section associated with the transponder has been released for the loading in the loading region. A communication device arranged in an unloading region can furthermore be configured to check the data read out from a transponder as to whether the section associated with the transponder has been released for the unloading in the unloading region.

In accordance with a further development of the invention, a respective communication device does not save or delete any data on the transponder or transponders. The transponders are thus not written by the communication devices, but only read. The information or codes contained in the data is/are thus permanently stored on the transponders and was/were, for example, stored there during the configuration of the conveyor system.

The data stored on the transponders can in particular contain information on the quality of the conveyed product and/or on the characteristics of the conveyed products and/or on the loading region at which the loading of the section with the conveyed product took place and/or on the intended unloading region at which the unloading of the section is intended. The data can be transported on the transponders along the conveying direction in parallel with the conveyed products and can be provided to downstream units or process controls.

The data stored on the transponders can preferably comprise process commands and/or control commands for at least one station of the conveyor system. A station can in particular be a loading station provided in a loading region, an unloading station provided in an unloading region, a weighing station, a quality detection station or another station that can be integrated into the conveyor system, with each station preferably having a communication device for the wireless communication with the transponders.

The data transfer between stations of the conveyor system can take place via the transponders provided at the conveyor with reference to the process commands and/or control commands. Information can thus be transmitted between the stations with the aid of the transponders without any other connection having to be installed between the stations, for instance via lines or radio. It thereby becomes possible that controls are only installed locally at the process stations and that the conveyor system can nevertheless be controlled in a complex, comprehensive manner.

The process commands and/or control commands can also contain other information such as quality information and processing information. The process commands and/or control commands transmitted by means of a transponder in this respect do not have to be related to a conveyed product, but can rather comprise any generally desired commands or information going beyond it.

The process commands and/or control commands can, for example, be written by a station to one of the transponders and can be read by another station that then executes the commands. A loading station can, for example, save a command on the transponder during the loading of a section with a specific conveyed product that the conveyed product has to be weighed. When the section then runs through a weighing station, the weighing station executes the command in that it weighs the conveyed product. In accordance with another example, a specific mode of operation of a station, for instance of a sorting station, that is operable in a plurality of modes of operation, can be selected with reference to the process commands and/or control commands.

The respective transponder is preferably arranged within an associated section at or in the conveyor. The transponder is thus located in the section of the conveyor associated with it. The transponder can in this respect be integrated or embedded in the section. The transponder can thus be received in the respective section so that it is protected from contamination and damage.

Each section of the conveyor is preferably associated with exactly one transponder. The conveyor thus does not have any sections that are not associated with a transponder. The transport of conveyed products can thereby be controlled over the total length of the conveyor by means of the transponders.

A transit time of the associated section can be determined, in particular between a loading region and an unloading region of the conveyor system, using the transponder and/or the data stored thereon.

The transit time of the transponder between at least two defined positions in the conveyor system can be determined, e.g. in that the transponder is detected offset in time by two different communication devices having fixedly defined, known positions. The transit time information or logistic information can thereby be calculated that is used e.g. as the data sets or control commands.

A further subject of the present invention is a conveyor system for conveying at least one conveyed product using a continuously revolving conveyor, said conveyor system preferably being configured as described above, with the conveyor having a lead section and a return section, with the lead section and the return section of the conveyor together forming a ring-like conveyor line, with the lead section and the return section not being guided in opposite directions along the same line, but rather extending along different lines, and with the conveyor being a pocket conveyor belt. Unlike known conveyor lines in which a conveyor configured as a conveyor belt, for instance, can be divided into a lead belt and a return belt and in which only the lead belt forms the actual conveyor line, while the return belt is led back against the conveying direction, the lead section and the return section extend along different lines and are in this respect preferably closed in annular shape, with them together forming the conveyor line.

The conveyor system preferably comprises at least one region in which the conveyor runs through a corner that is in particular a sharp corner. The conveyor can negotiate corners due to its configuration as a pocket conveyor belt. The conveyor system can furthermore have inclines of up to 30 degrees for the conveyor.

In accordance with a very particularly preferred embodiment of the present invention, the conveyor is a closed pocket conveyor belt. A pocket conveyor belt is a rubber belt that is folded to form a loop between the belt ends. The belt ends preferably have profiles with wire ropes vulcanized in and serve for the guidance of the belt in a conveyor rail by means of the guide rollers and support rollers, with the wire ropes taking over the tensile forces of the belt. The wire ropes are preferably arranged above one another in a vertical axis, which ensures that the pocket conveyor belt always has the same radius even in corners up to 180°.

In this embodiment, the conveyor system preferably has a guide for the conveyor, with the guide in particular having support rollers and guide rollers for guiding profiles provided at the longitudinal sides of a pocket conveyor belt that can be hung into the support rollers and guide rollers.

The present invention furthermore relates to a conveyor, in particular to a conveyor belt for a conveyor system in accordance with the invention, with at least one transponder, and preferably at least one RFID transponder, being provided at or in the conveyor, and with the conveyor being a pocket conveyor belt. The transponder or transponders can in particular be embedded in a profile formed at the longitudinal side of a pocket conveyor belt.

A plurality of transponders are preferably arranged distributed over the total length of the conveyor at or in the conveyor, with it being particularly preferred that the individual transponders are spaced apart at regular intervals from one another.

The conveyor in accordance with the invention is particularly preferably a closed pocket conveyor belt.

The present invention further relates to a method of conveying conveyed products that is carried out in the previously conveyor system in accordance with the invention.

A transponder moving into a loading region of the conveyor system is preferably detected in the method and the data stored on the transponder are read. In this respect, a check is preferably made with reference to the stored data as to whether the section associated with the transponder is loaded and/or whether the section has been released for a conveyed product, with the section being loaded with the conveyed product in the loading region when it has been found that the section is not loaded and/or has been released for the conveyed product.

It is proposed in a further development of the idea of the invention that data with respect to the load of the section with the conveyed product are stored on the at least one transponder.

It is further preferred that a transponder moving into an unloading region is detected and the data stored on the transponder are read, with a check being made with reference to the data whether the unloading region is the unloading region intended for the section and the section being unloaded as required.

Figure 2:
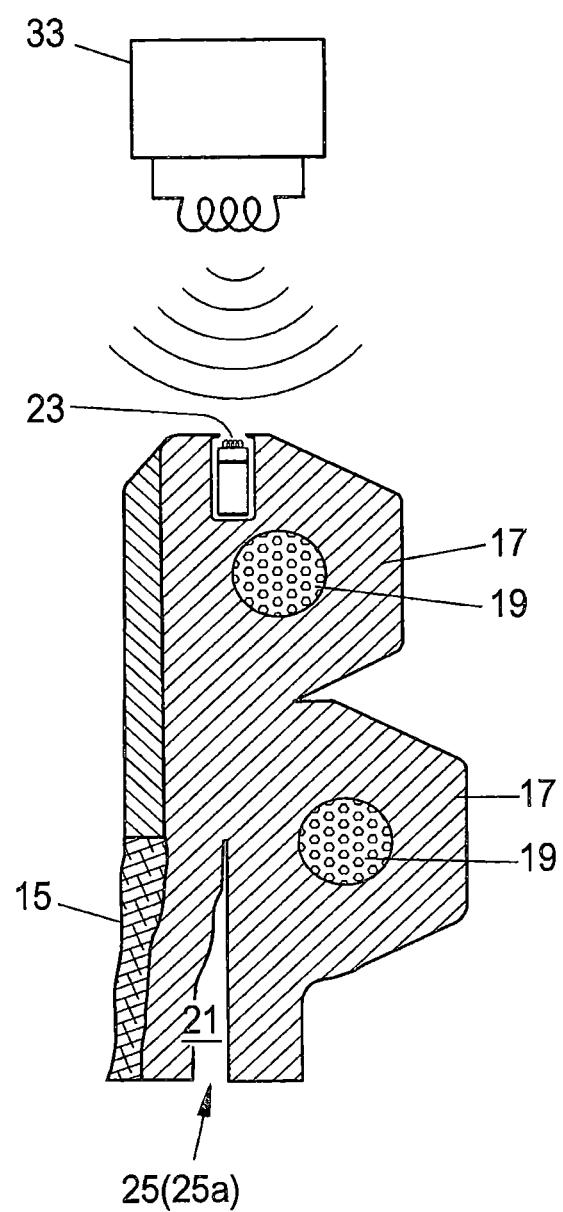
Figure 3:
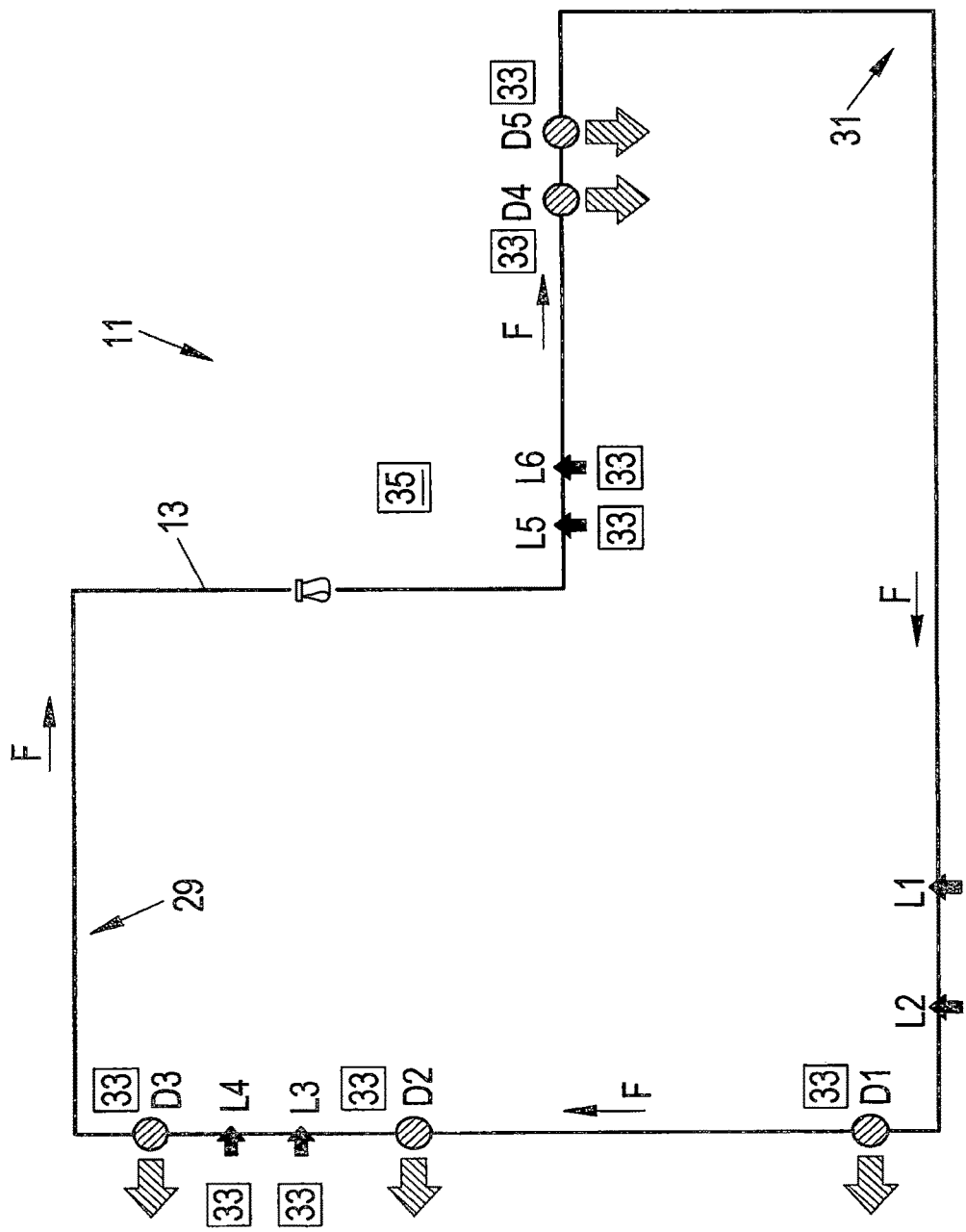
Figure 4:
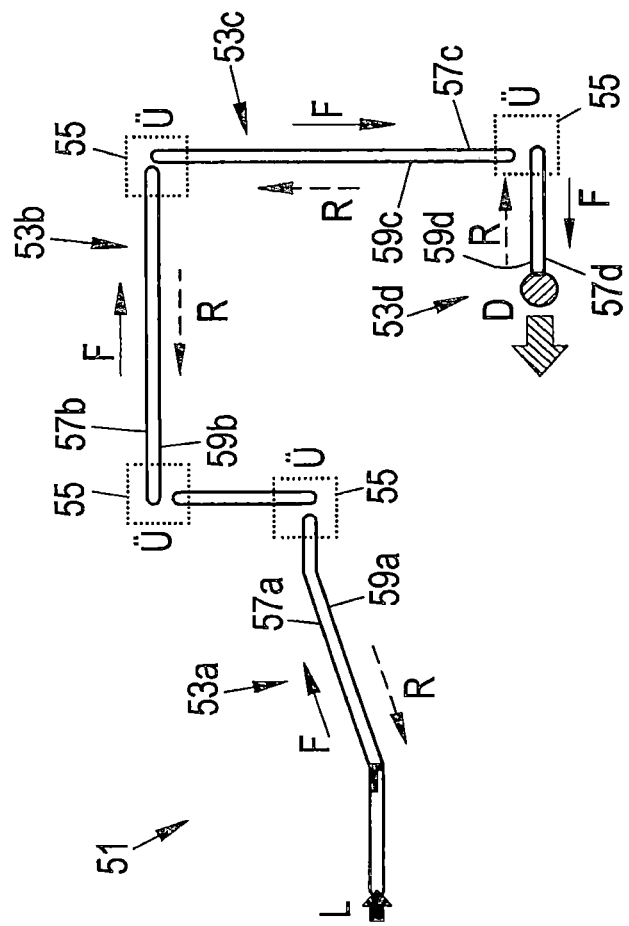

The present invention will be described by way of example in the following with reference to the drawings. There are shown, schematically in each case, FIG. 1 a perspective part view of a conveyor system in accordance with the invention;

FIG. 2 a part representation of a section in accordance with the line A-A in FIG. 1;

FIG. 3 a representation of a ring-like conveyor line implemented using the conveyor system of FIG. 1; and FIG. 4 a representation of a line conveyor system in accordance with the prior art.

The conveyor system 11 in accordance with the invention shown in FIGS. 1 to 3 has a conveyor 13 that is hung at a guide, not shown, that revolves continuously and that is movable along a conveying direction F such that conveyed products, in particular packaged material or bulk material, can be transported along the conveying direction F by means of the conveyor 13. The conveyor 13 is configured as a pocket belt conveyor that comprises a flat belt 15, for example composed of a highly flexible rubber, that revolves continuously, viewed in the conveying direction F. As FIG. 1 shows, the flat belt 15 is folded to form a loop such that a drop-shaped, closed pocket 21 is formed in which the conveyed product can be received. Vulcanized profiles 17 are formed at the outer longitudinal edges of the belt 15 and a respective wire rope 19 extends in their center. The profiles 17 run above one another in support rollers and guide rollers, not shown, of the guide. In addition, the wire ropes 19 can take up tensile forces of the belt from drive elements arranged in the guide, for example in the form of driven rollers, to move the conveyor 13 along the conveying direction F.

In the example shown, RFID transponders 23 are arranged in the profile 17 of the conveyor 13 that are distributed at regular intervals form one another over the total length of the conveyor 13, viewed in the conveying direction F. The transponders 23 are embedded in the profile 17, whereby they are protected from damage and contamination. The embedding takes place in this respect such that each transponder 23 is set into a bore introduced into the profile 17 and the bore is subsequently closed.

A section 25 of the conveyor 13 extending in the conveying direction F is associated with each transponder 23. The respective transponder 23 is provided for storing digital data with respect to a loading of the associated section 25 with conveyed products. In the example shown, the respective transponder 23 is located within its associated section 25. The section 25a is thus associated with the transponder 23a, while the section 25b, etc., is associated with the transponder 23b, etc. The section 25a in this respect is adjacent to the section 25b at least approximately in the center between the transponders 23a, 23b. The section 25 is correspondingly adjacent to the section 25c at least approximately at the center between the transponders 23b, 23c.

A different association can, however, also be possible. For example, a section 25 arranged downstream viewed in the conveying direction F can be associated with each transponder 23a. The section 25b can, for example, be associated with the transponder 23, the section 23c can be associated with the transponder 23b, etc.

The division of the conveyor 13 into the individual sections 25 is only to be considered as an example, particularly since the flat belt 15 forms a continuous, planar support surface and the sections 25 thus merge seamlessly into one another. It is, however, advantageous in the association of the sections 25 at a respective transponder 23 that data with respect to the load of a section 25 can be stored on the associated transponder 23 and can be transported together with the load along the conveying direction F. An intelligent conveyor system can thereby be implemented as will be explained in more detail in the following.

As shown in FIG. 3, the conveyor system 11 has a ring-like conveyor line 27 that is formed both by a lead section 29 and by a return section 31 of the conveyor 13. In this respect, the lead section 29 and the return section 31 are not led along the same line in opposite directions, but they rather extend along different lines, whereas with known conveyor lines, as will be explained in the following with respect to FIG. 4, the lead and the return of a conveyor extend along the same route and the return is normally not part of the conveyor line.

The conveyor system 11 can have a plurality of loading regions L1, L2, L3, L4, L5 and L6 as well as a plurality of unloading regions D1, D2, D3, D4 and D5. A respective section 25 of the conveyor 13 located in the loading region L1, L2, L3, L4, L5 and L6 can be loaded with a conveyed product in a loading region L1, L2, L3, L4, L5 and L6. It can also be possible in this respect that a plurality of sections 25 are loaded simultaneously after one another.

The belt 15 of the conveyor 13 can be opened in each loading region L1 to L6 with special guide rollers to form a U-shaped pocket so that conveyed products can be poured into the pocket from above (not shown). In this manner, a section 25 of the conveyor 13 that runs through the respective loading region L1 to L6 can be loaded with a conveyed product.

In a loading regions D1 to D5, the belt 15 can, for example, be opened in a gradual transition from the closed loop into a flat horizontal surface. The conveyed product falls from the flat horizontal surface at a deflection point provided in the unloading region. The belt 15 is again brought into its pocket shape downstream of the deflection point. Each unloading region D1 to D5 can in this respect be designed such that a section 25 running through the unloading region D1 to D5 is selectively unloaded or not unloaded. A section 25 loaded with conveyed product can therefore also run through an unloading region D1 to D5 without being unloaded there.

As mentioned, each transponder 23 is provided for the storage of data with respect to the load of its associated section 25. In this respect, the transponders 23 are RFID transponders that are known per se and that have a corresponding memory for storing the data. In addition, a communication device 33 that can be designed as an RFID read/write device in a manner known per se is arranged in each loading region L1 to L6 and in each unloading region D1 to D5. The respective communication device 33 of a loading region or unloading region can in this respect communicate wirelessly with a transponder 23 running through the loading region or unloading region to save date on the transponder 23 and/or to read data stored by the transponder 23.

The section 25a (cf. FIGS. 1 and 2) can, for example, run through the loading region L1 during the operation of the conveyor system 11. In this respect, the communication device 33 provided in the loading region L1 can check with reference to data stored on the transponder 23a whether the section 25a is loaded or is not loaded. If the section 25a is not loaded, it can be loaded with a conveyed product in the loading region L1, with the communication device 33 storing data with respect to the load of the section 25 with the conveyed product on the transponder 23a. Information with respect to the intended unloading region, for example D2, can in particular be contained in the stored data.

When the section 25a is conveyed onward in the conveying direction F, it first moves into the unloading region L2. The communication device 33 there can determine with reference to the data stored on the transponder 23a that the section 25a is loaded and thus prevent the section 25a from also being loaded in the loading region L2.

When the section 25a moves into the unloading region D1, the communication device 33 there can determine with reference to the data stored on the transponder 23a that the unloading region D1 is not the intended unloading region. The section 25a is thus conveyed through the unloading region D1 without being unloaded there.

If the section 25a finally moves into the unloading region D2, the communication device 33 there can determine by reading the data of the transponder 23a that the section 25a has reached its intended unloading region and can initiate the unloading of the section 25a in this unloading region. Once the section 25a has been unloaded, the communication device 33 can delete the data stored on the transponder 23a so that it is again available for a repeat loading with conveyed products in one of the loading regions L1 to L6.

In accordance with a modification, the section 25a can only be released for the transport of a specific conveyed product. A contamination of this section by a different conveyed product can thereby be avoided. The release of the section 25a for the transport of only a specific conveyed product takes place, for example, in that corresponding data are stored on the transponder 23a by means of a control 35 of the conveyor system 11 of higher rank than the communication devices 33, with it being fixed by said data that only the specific conveyed product can be transported by means of the section 25a.

It is advantageous if the control 35 is in communication connection with the communication devices 33 such that the control 35 can use one of the communication devices 33 to transmit the corresponding data to release the section 25a for the specific conveyed products to the transponder 23a. Alternatively, the control 35 can use a separate communication device (not shown) integrated into the conveyor line 27 for the data transmission. The data can in this respect be stored on the transponder 23a such that they can only be deleted by the control 35, but not by one of the communication devices 33.

If the section 25a reaches the loading region L3, for example, the communication device 33 checks this loading region with reference to the data stored on the transponder 23a as to whether the conveyed products loadable in the loading region L3 correspond to the conveyed products specified in the data. If this is the case, the loading of the section 25a takes place in the loading region L3. Otherwise the section 25a runs through the loading region L3 without being loaded. If the section 25a is loaded, the communication device 33 of the loading region L3 can additionally save data on the transponder 23a that contain information on the intended unloading region for the conveyed products. Alternatively, these data can likewise already be stored on the transponder 23a by the higher-ranking control. If the section 25a reaches the intended unloading region, it can then be recognized with reference to the stored information that the section 25a should be unloaded. The section 25a is then also actually unloaded.

In accordance with a modification, the section 25a can be released for a group of conveyed products. In accordance with a further modification, the section 25a can only be released for the loading in a specific loading region and/or can only be released for the unloading in a specific unloading region by means of the corresponding data stored on the transponder. The section 25a can thus only be loaded in the specific loading region and/or can only be unloaded in the specific unloading region.

In accordance with another variant, no data are written to the transponder 23 by the communication devices 33. The communication devices 33 rather only read the data stored on the transponders 23 so that the communication devices 33 can be designed as purely RFID reading devices. The data on the transponders 23 can in this respect have been stored, for example, on the transponders 23 by means of the control 35 during the configuration of the conveyor system 11.

The control 35 can, for example, save corresponding data on the transponder 23a by means of which it is achieved that the section 25a is only loaded in the loading region L3 and is only unloaded in the unloading region D4.

The section 25a can also only be released for loading for a specific conveyed product by means of the data stored on the transponder 23a. As soon as the section 25a has reached that loading region L1 to L6 in which the specific conveyed product can be loaded, the loading of the section 25a with the specific conveyed product takes place. The unloading region intended for the specific conveyed product can furthermore be specified in the data so that the section 25 can be unloaded at the intended unloading region after reaching it.

The control 35 can furthermore determine the transit time that the transponder 23a, for example, requires for the route between the two loading stations L1 and L2. The control 35 can determine the conveying speed in a manner known per se from the transit time and the known route length. Furthermore, the control 35 can determine the transit time for a conveyed product from the conveying speed and from the known route length between the loading region and the unloading region intended for the conveyed product.

The other transponders 23 and associated sections 25 of the conveyor 13 can be used in the same manner as was described above with respect to the transponders 23a and to the associated section 25a to transport conveyed products and data between the loading regions L1 to L6 and the unloading regions D1 to D5 of the conveyor system 11. The data can in this respect also include information on the quality of the conveyed products, on the characteristics of the conveyed product, on the loading region and/or on the intended unloading region for the conveyed products, said information being able to be transported over the conveyor line 27 with the conveyed products and thus likewise being able to be passed on.

Different conveyed products can be transported, in particular also simultaneously, on different sections 25 with short cycle times and over different part lines of the conveyor line 27 due to the intelligent conveyor system 11 thus implemented. Since the control 35 can be in communication connection with the communication devices, the communication devices 33 can transfer the data read by them of the transponders 23 running past them to the control 35. The control 35 can then determine where which conveyed products are located on the conveyor line 27 at any time with reference to the data coming in. The control 35 can furthermore output a corresponding real-time visualization with reference to which an operator can monitor the operation of the conveyor system 11.

The conveyor system 51 shown in FIG. 4 and known from the prior art comprises part conveyor systems 53a, 53b, 53c and 53d that are arranged in series and between which a respective transfer point 55 is provided to transport a conveyed product from the part conveyor system arranged upstream of the respective transfer point 55 to the respective part conveyor system arranged downstream. A conveyor line is implemented by the conveyor system 51 in which a conveyed product can be transported from a loading point L disposed at the start of the conveyor line along the conveying direction F to an unloading region D disposed at the end of the conveyor line.

In this respect, the transport of the conveyed products takes place along a feed 57a, 57b, 57c and 57d of the respective part conveyor system 53a, 53b, 53c and 53d running in the conveying direction F, while the respective return 59a, 59b, 59c, 59d of the respective part conveyor system 59a, 59b, 59c, 59d is led back on the same route as the respective lead with a return direction R opposite the conveying direction F. The conveyor system 51 or its part conveyor systems 53a, 53b, 53c and 53d thus do not form any ring-like closed conveyor line in which the lead and the return are guided along different routes.

However, in connection with a part conveyor system 53a-53d, a conveyor or a conveyed product with transponders can be used. A conveyor system in accordance with the invention therefore does not necessarily have to have a ring-like conveyor line such as was described above with reference to FIGS. 1 to 3, but can rather also be designed as a line conveyor system with a defined start and a defined end of the conveyor line.

REFERENCE NUMERAL LIST 11 conveyor system
13 conveyor
15 flat belt
17 profile
19 wire rope
21 pocket
23, 23a, 23b transponder
25, 25a, 25b, 25c section
27 conveyor line
29 lead section
31 return section
33 communication device
35 control
L1, L2, L3, L4, L5, L6 loading region
D1, D2, D3, D4, D unloading region
51 conveyor system
53a, 53b, 53c, 53d part conveyor system
55 transfer point
57a, 57b, 57c, 57d lead
59a, 59b, 59c, 59c return
F conveying direction
R return direction

The invention claimed is:

1. A conveyor system for conveying at least one conveyed product, comprising
   a continuously revolving conveyor, with the conveyor being a pocket conveyor belt;
   at least one transponder arranged at or in the conveyor; and
   at least one communication device for a wireless transfer of data to the at least one transponder and/or for a wireless reading of data stored in the at least one transponder,
   wherein the conveyor system has at least one loading region for loading a respective section of the conveyor,
   wherein the conveyor system has at least one unloading region for unloading a respective section of the conveyor, and
   wherein each unloading region has at least one communication device, with the at least one communication device being configured
      to detect a transponder moving into the unloading region; and/or
      to read the data stored on the transponder; and/or
      to check with reference to the stored data whether a section associated with the transponder is loaded; and/or
      to check with reference to the stored data whether the unloading region is the unloading region intended for the section; and/or
      if the unloading region is the intended unloading region, to initiate the unloading of the section in the unloading region; and/or
      if the unloading region is not the intended unloading region, to prohibit the unloading of the section in the unloading region; and/or
      to delete data on the transponder with reference to the load of the section after its unloading.

2. The conveyor system in accordance with claim 1,
   wherein a plurality of transponders are attached at or in the conveyor distributed over a total length of the conveyor,
   with each of the plurality of transponders comprising data on a respective section of the conveyor with conveyed products being able to be stored on each of the transponder via the at least one communication device; and/or wherein the at least one transponder arranged at or in the conveyor is an RFID transponder; and wherein the at least one communication device is an RFID read/write device.

3. The conveyor system in accordance with claim 1,
   wherein each loading region of the conveyor system has at least one communication device, with the at least one communication device being configured
      to detect a transponder moving into the loading region; and/or
      to read the data stored on the transponder; and/or
      to check with reference to the stored data whether a section associated with the transponder is loaded; and/or
      if the section is not loaded, to initiate the loading of the section in the loading region; and/or
      to store data with respect to the load of the section on the transponder.

4. The conveyor system in accordance with claim 3,
   wherein at least one communication device of at least one loading region of the conveyor system is configured to check whether a section is released for the conveyed product before the loading of the section with a conveyed product.

5. The conveyor system in accordance with claim 3,
   wherein a section associated with the at least one transponder is only released for a specific loading region and/or is only released for a specific unloading region with reference to the data stored on the at least one transponder.

6. The conveyor system in accordance with claim 5,
   wherein at least one communication device arranged in at least one loading region is configured to check the data read from a transponder as to whether a section associated with the transponder is released for the loading in the loading region; and/or
   at least one communication device arranged in at least one unloading region is configured to check the data read from a transponder as to whether the section associated with the transponder is released for the unloading in the unloading region.

7. The conveyor system in accordance with claim 1,
   wherein a section is only released for the loading with a specific conveyed product or with a conveyed product from a group of specific conveyed products with reference to the data stored on the at least one transponder.

8. The conveyor system in accordance with claim 1,
   wherein the at least one communication device cannot save or delete data on the at least one transponder; and/or
   wherein the data on the at least one transponder comprise information on at least one of the quality of the conveyed products, the characteristics of the conveyed products, the loading region, and the unloading region intended for the conveyed product; and/or
   wherein the data on the at least one transponder comprise at least one of process commands and control commands for at least one station of the conveyor system; and/or wherein the at least one transponder is arranged within its associated section at or in the conveyor.

9. The conveyor system in accordance with claim 1, wherein each section of the conveyor is associated with exactly one transponder.

10. The conveyor system in accordance with claim 1, wherein a transit time of the associated section can be determined, preferably between a loading region and an unloading region of the conveyor system with reference to the at least one transponder and/or to the data stored thereon.

11. The conveyor system in accordance with claim 1, wherein a transit time of the at least one transponder between at least two defined positions in the conveyor system can be determined.

12. The conveyor system in accordance with claim 1, wherein the conveyor is a closed pocket conveyor belt.

13. A method of conveying conveyed products, in which conveyed products are conveyed in a conveyor system, comprising a continuously revolving conveyor, with the conveyor being a pocket conveyor belt;
   at least one transponder arranged at or in the conveyor; and
   at least one communication device for a wireless transfer of data to the at least one transponder and/or for a wireless reading of data stored in the at least one transponder wherein the conveyor system has at least one loading region for loading the respective section of the conveyor; and/or having at least one unloading region for unloading the respective section of the conveyor,
   a transponder moving into a loading region of the conveyor system is detected and the data stored on the transponder are read;
   with a check being made with reference to the stored data as to
      whether the section associated with the transponder is loaded; and/or
      whether the section is released for a conveyed product; and
   with the section being loaded with the conveyed products in the loading region when it has been found that the section is not loaded and/or is released for the conveyed product.

14. A method of conveying conveyed products, in which conveyed products are conveyed in a conveyor system comprising
   a continuously revolving conveyor, with the conveyor being a pocket conveyor belt;
   at least one transponder arranged at or in the conveyor; and
   at least one communication device for a wireless transfer of data to the at least one transponder and/or for a wireless reading of data stored in the at least one transponder wherein the conveyor system has at least one loading region for loading the respective section of the conveyor; and/or having at least one unloading region for unloading the respective section of the conveyor,
   a transponder moving into a loading region of the conveyor system is detected and the data stored on the transponder are read;
   with a check being made with reference to the stored data as to
      whether the section associated with the transponder is loaded; and/or
      whether the section is released for a conveyed product; and
   with the section being loaded with the conveyed products in the loading region when it has been found that the section is not loaded and/or is released for the conveyed product,
   wherein data with respect to the load of the section with the conveyed product and/or process commands and/or control commands are stored on the transponder; and/or
   wherein a transponder moving into an unloading region is detected and the data stored on the transponder are read, with a check being made with reference to the data whether the unloading region is the unloading region intended for the section and the section being unloaded as required.

* * * * *